The present invention relates to improvements in rotary seals.

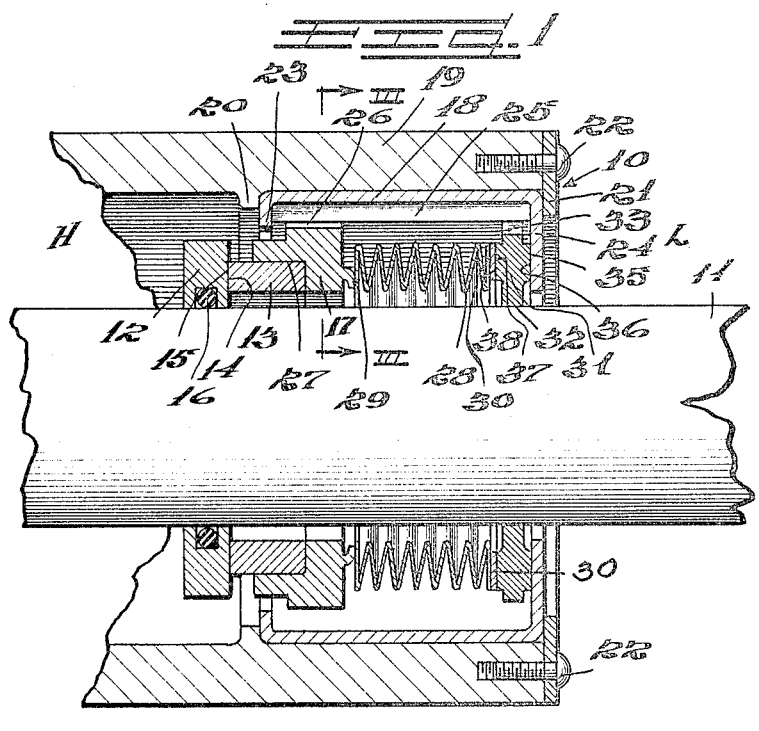
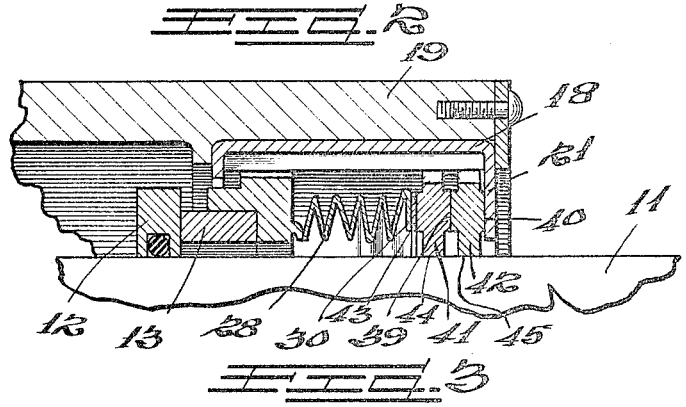
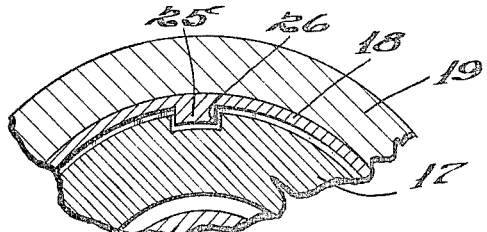
INVENTOR.
Remi J. Gits 3,288,474
BELLOWS SEAL STRUCTURE
Remi J. Gits, Hinsdale, Ill., assignor to Gits Bros. Mfg.
Co., Chicago, Ill., a corporation of Delaware
Filed June 14, 1963, Ser. No. 287,840
7 Claims. (Cl. 277—88)

More particularly, the invention relates to a rotary seal of the type for sealing a rotating shaft member passing through an opening in a housing wherein a rotating ring is mounted on the shaft and a stationary ring is axially held against the rotating ring.

The invention contemplates, in a preferred embodiment, providing an expansible bellows metal seal for holding the stationary sealing ring against the rotating ring. In an arrangement employing a metal bellows seal, the bellows is advantageous in that it accommodates axial movement of the stationary ring and provides an absolute secondary seal, while acting as a resilient biasing means for holding the stationary sealing ring against the rotating ring. However, with extensive use rupture of the bellows can occur with a usual consequent rush of fluid through the seal.

It is accordingly an object of the present invention to provide a rotating seal utilizing an expansible bellows wherein with rupture of the bellows rapid leakage or rush of fluid through the seal is prevented.

A further object of the invention is to provide a rotary seal employing an expansible annular bellows wherein rupture of the bellows can occur and leakage of the fluid will be prevented by an auxiliary or safety seal which will immediately be operative and will prevent any major leakage of the fluid through the sealing unit so that the principal seal can be repaired or replaced by repair of the bellows.

A still further object of the invention is to provide an improved rotary seal assembly of improved construction which is relatively simple and inexpensive to manufacture and provides a compact commercial unit avoiding disadvantages heretofore present in the prior art.

Other objects, advantages and features will become more apparent with the teaching of the principles of the invention in connection with the disclosure of the preferred embodiments thereof in the specification, claims and drawings, in which:

FIGURE 1 is a vertical sectional view taken through the axis of a seal assembly embodying the principles of the present invention;

FIGURE 2 is a fragmentary sectional view illustrating a modification of the invention; and FIGURE 3 is a vertical sectional view taken substantially along line III—III of FIGURE 1.

On the drawings:

As shown in FIGURE 1, a seal assembly 10 surrounds a rotating shaft 11 for preventing the leakage of fluid therealong. The seal assembly has a rotating ring 12 with an annular radial sealing face 14 engaged by an annular radial stationary sealing face 15 at the end of a stationary sealing ring 13. The ring 13 is part of a stationary sealing ring unit which includes an adapter or carrier ring 17.

The rotating ring 12 is suitably mounted on the shaft 11 for rotation therewith such as by being mounted thereon in close fitting relationship and sealed thereto and driven in rotation thereby through a compressible O-ring 16 which seats in an inner groove in the ring 12.

Surrounding the seal assembly is a casing ring or sleeve 18 which is supported in an annular housing 19 with a suitable opening to receive the casing sleeve 18. The sleeve 18 abuts against an annular inner ridge 20 in the housing 19 and is held in place by a clamping ring 21 at the other end secnured to the housing by screws 22.

The carrier ring 17 supports the statioonary sealing ring 13 by the sealing ring 13 being seated in a recess 27 in the carrier ring. The carrier ring is biased axially to hold the stationary ring 13 against the rotating ring 12, and rotational movement of the carrier ring is prevented by an axial rib 25 within the casing sleeve 18. The carrier ring 17 has an axial groove 26 so as to straddle the rib 25 and permit axial movement of the carrier ring along the sleeve 18. Movement to the extreme left is limited by an inturned flange 23 at one end of the sleeve.

Biasing force for the stationary sealing ring 13 is obtained from an annular metal bellows 28 which is expansible and which provides a secondary seal to permit axial movement of the stationary ring 13. The metal bellows is secured to the carrier ring by a weld at 29.

At the other end of the metal bellows 28 is welded a washer 30 which has an axially facing annular smooth sealing face 37.

Facing toward the face 37 is a smooth annular face 36 on an inwardly turned flange 24 of the sleeve 18. Between the faces 36 and 37 is a floating end ring 31.

The floating end ring 31 has side sealing faces 38 and 35 respectively engaging faces 37 and 36. The floating ring 31 is made of a material such as carbon, and is prevented from rotating by having an axially extending groove 33 which straddles the rib 25.

The inner diameter 32 is sized to closely fit over the shaft 17 so as to be in close running relation thereto. The use of the seal is contemplated with higher fluid pressure in the zone to the left shown at H in FIGURE 1 and the lower fluid pressure to the right shown at L. With leakage or rupture of the bellows 28 pressure will increase within the bellows but a sudden rush or leak of fluid past the seal assembly 10 will not be permitted since it will be blocked by the floating end ring 31. Leakage between the shaft 11 and the ring 31 will be prevented by the close running inner diameter 32 of the end ring, and leakage between the end ring and sleeve will be prevented by the sealing fit of the surfaces 35 and 36, which also seal during normal operation.

As a general summary of operation, the seal is employed for a rotating shaft 11 with the rotating ring 12 turning with the shaft and the stationary ring 13 engaging the ring 12 and providing a primary seal to prevent the leakage of higher pressure fluid from the zone H to the right to zone L as shown in FIGURE 1 of the drawings. The fluid will surround the metal bellows 28 and with rupture of the bellows which may occur with extended use of the seal the fluid may rush into the zone within the bellows but will not be permitted to leak in any substantial quantity past the seal assembly 10 since such leakage is blocked by the floating end ring 31 which is in close running relation to the shaft 11 and sealingly engages the flange 24 of the casing sleeve 18.

The carrier ring 17 and the floating end ring 31 are kept in rotational alignment by each non-rotatably engaging the rib 25 thus preventing rotational stress on the bellows 28. While the preferred form is illustrated it will be appreciated that the rib 25 could be omitted and the carrier ring 17 held against its rotation by the bellows 28 with means then being provided to prevent rotation of the bellows. Also while in a preferred arrangement the floating end ring 31 is prevented from rotating by the rib 25, in some arrangements other rotation means could be provided or some rotation permitted. Further the arrangement illustrated which permits the end ring 31 to float freely is highly advantageous for dexterity and self-alignment to retain sealing relationships and center itself with respect to the shaft for minimum wear, but in some arrangements the ring 31 could be secured to its adjoining part on either one or both sides.

FIGURE 2 shows an alternate arrangement with the major portions of the seal assembly being similar to FIGURE 1, incorporating a rotating ring 12, a stationary ring 13, a housing 19 and a bellows 28. Between the washer 30 and the inturned flange 21 are a pair of floating end rings 41 and 42 which have smooth sealing side faces facing each other at 39, and end surfaces 40 and 43, which each have inner circumferential surfaces 44 and 45 in close running relation to the shaft 11.

Thus it will be seen that I have provided an improved rotary seal assembly which meets the objectives and advantages above set forth and which is reliable in operation and serves to prevent leakage in the event of failure of a bellows seal thus obtaining the advantages of a metal expansible bellows seal while avoiding the dangers of failure thereof.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. In a rotary seal assembly for a rotating shaft member having a rotating ring and a stationary sealing ring having a sealing surface sealingly engaging the rotating ring,
   an expansible annular bellows for surrounding the shaft member and secured at one end to said stationary ring,
   a seal assembly support,
   and a non-rotatable end ring being sealingly related to the other end of said bellows and having an inner annular surface of a diameter to be in close running relation to said shaft and having an axial facing sealing suface engaging and sealingly related to said support so that with leakage of the bellows fluid leakage will be inhibited by said end ring.

2. In a rotary seal assembly for a rotating shaft member having a rotating ring and a stationary sealing ring having a sealing surface sealingly engaging the rotating ring,
   an expansible annular bellows for surrounding the shaft member secured at one end to said stationary ring and axially biasing said stationary ring toward said rotating ring,
   a support surrounding the shaft member,
   and a non-rotatable end ring sealingly related to the other end of said bellows and having an inner annular surface of a diameter to be in close running relation to said shaft and having an axial facing sealing surface engaging a sealing surface on said support so that with leakage of the bellows leakage along the shaft member will be inhibited by said end ring.

3. In a rotary seal assembly for a rotating shaft member having a rotating ring and a stationary sealing ring having a sealing surface sealingly engaging the rotating ring,
   an expansible annular bellows for surrounding the shaft member with one end sealed to said stationary ring,
   a seal assembly support,
   an annular sealing first face at said other end of the bellows,
   an annular sealing second face on said support axially facing said first face, and
   an end floating sealing ring between said first and said second faces and having an inner annular surface of a diameter to be in close running relation to said shaft to that with leakage of the bellows fluid leakage will be inhibited by said end ring.

4. In a rotary seal assembly for a rotating shaft member having a rotating ring and a stationary sealing ring having a sealing surface sealingly engaging the rotating ring,
   an expansible annular bellows for surrounding the shaft member and sealed at one end to said stationary ring,
   a seal assembly support,
   an annular sealing first face at said other end of the bellows,
   an annular sealing second face on said support axially facing said first face,
   an end floatiing sealing ring between said first and said second faces and having an inner annular surface of a diameter to be in close running relation to said shaft so that with leakage of the bellows fluid leakage will be inhibited by said end ring, and means on said support holding said end ring against rotation.

5. In a rotary seal assembly for a rotating shaft member having a rotating ring and a stationary sealing ring having a sealing surface sealingly engaging the rotating ring,
   an expansible annular bellows for surrounding the shaft member and sealed at one end to said stationary ring,
   a seal assembly support,
   an annular sealing first face of said other end of the bellows,
   an annular sealing second face on said support axially facing said first face, and
   a pair of end floating sealing rings between said first and said second faces each having an inner annular surface of a diameter to be in close running relation to said shaft so that with leakage of said bellows fluid leakage will be inhibited by said end ring,
       said end rings having side faces sealingly engaging each other.

6. A rotary seal assembly for a rotating shaft member comprising in combination,
   a rotating ring having an inner annular groove with a resilient O-ring therein for supporting the ring on a rotating shaft a stationary carbon sealing ring supported on a carrier ring,
   an annular metal bellows welded at one end to said carrier ring,
   a sealing washer welded to the other end of said bellows having an annular sealing face, a floating end ring having a face sealingly engaging said washer,
   a casing sleeve having one end turned inwardly for limiting movement of the carrier ring and having the other end turned inwardly with an axially inwardly facing annular sealing surface engaged by said floating end ring, and
   an axially extending rib within said sleeve,
       said carrier ring and said end ring having axial notches slidingly straddling said rib for preventing rotation of the carrier ring and end ring,
       said end ring having an inner annular surface of a diameter to be in close running relation with the shaft and prevent substantial leakage between the end ring and shaft so that with leakage of the bellows flow of fluid past the seal assembly will be substantially prevented.

7. In a rotary seal assembly for a rotating shaft member having a rotating ring and a stationary sealing ring having a sealing surface sealingly engaging the rotating ring,
   a carrier ring for said stationary sealing ring,
   an annular metal expansible bellows welded at one end to said carrier ring, an annular washer welded at the other end of said bellows, a floating end ring having an annular surface sealingly engaging said washer at one side of the end ring, and a seal assembly support member having an axially facing sealing surface engaging said end ring, said end ring having an inner diameter to be in close running relation to the shaft so that the end ring will prevent substantial leakage of fluid with rupture of the bellows.

References Cited by the Examiner

UNITED STATES PATENTS

| 1,618,655 | 2/1927 | Halvorsen | 277—81 X |
| 2,727,765 | 12/1955 | Kilpatrick | 277—83 |

FOREIGN PATENTS 784,708 10/1957 Great Britain.

SAMUEL ROTHBERG, *Primary Examiner.*